(12) United States Patent
Boger et al.

(10) Patent No.: US 10,863,546 B2
(45) Date of Patent: Dec. 8, 2020

(54) APPARATUS AND METHOD FOR ADAPTIVE CONTENTION WINDOW (ACW)

(71) Applicant: Apple Inc., Cupertino, CA (US)

(72) Inventors: Yoel Boger, Shoham (IL); Yaniv Dvory, Kfar Saba (IL); Jarkko L. Kneckt, Los Gatos, CA (US); Guoqing Li, Campbell, CA (US); Christiaan A. Hartman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/010,333

(22) Filed: Jun. 15, 2018

(65) Prior Publication Data

US 2019/0387545 A1 Dec. 19, 2019

(51) Int. Cl.
*H04W 74/08* (2009.01)
(52) U.S. Cl.
CPC .............................. *H04W 74/0825* (2013.01)
(58) Field of Classification Search
CPC ................................................ H04W 74/0825
USPC ......................................................... 370/329
See application file for complete search history.

(56) References Cited

U.S. PATENT DOCUMENTS

| | | | | |
|---|---|---|---|---|
| 2012/0106371 A1* | 5/2012 | Abraham | ............ | H04B 7/0452 370/252 |
| 2014/0079046 A1* | 3/2014 | Yang | ................. | H04W 74/0825 370/338 |
| 2016/0212768 A1* | 7/2016 | Wentink | .................. | H04L 47/27 |
| 2017/0019909 A1* | 1/2017 | Si | ............. | H04L 47/27 |
| 2017/0202017 A1* | 7/2017 | Zhou | ..................... | H04W 24/10 |
| 2017/0202023 A1* | 7/2017 | Zhou | ..................... | H04W 24/10 |

\* cited by examiner

*Primary Examiner* — Hassan A Phillips
*Assistant Examiner* — Mohammed S Chowdhury
(74) *Attorney, Agent, or Firm* — Sterne, Kessler, Goldstein & Fox P.L.L.C.

(57) ABSTRACT

Some embodiments enable improved aggregated throughput and average latency in a wireless communication channel. Wireless electronic devices may implement adaptive contention window (ACW) channel access that improves channel capacity and enables latency sensitive applications (e.g., video streaming), especially when all wireless electronic devices operating on the channel as well as those in proximity utilize ACW channel access. Some embodiments detect when wireless stations on the communication channel as well as wireless stations in proximity are utilizing ACW channel access to obtain a transmit opportunity (TXOP). Based on the detection, an access point (AP) can instruct an associated wireless station to: use ACW channel access to obtain a TXOP, use a different channel access method obtain a TXOP as needed, disassociate and associate with a different AP, or use a different channel access method to obtain a TXOP.

20 Claims, 10 Drawing Sheets

| Two Parts of HE-SIG-A | Bit | Field | Number of bits | Description |
|---|---|---|---|---|
| HE-SIG-A2 (HE SU PPDU) or HE-SIG-A3 (HE ER SU PPDU) | B0-B6 | TXOP | 7 | Set to 127 to indicate no duration information when TXVECTOR parameter TXOP_DURATION is set to UNSPECIFIED.<br>Set to a value less than 127 to indicate duration information for NAV setting and protection of the TXOP as follows:<br>  If TXVECTOR parameter TXOP_DURATION is less than 512, then B0 is set to 0 and B1-B6 is set to floor (TXOP_DURATION/8) where B1 is the LSB. Otherwise, B0 is set to 1 and B1-B6 is set to floor ((TXOP_DURATION – 512) / 128) where B1 is the LSB.<br>Where<br>  B0 indicates the TXOP length granularity. Set to 0 for 9 µs; otherwise set to 1 for 128 µs.<br>  B1-B6 indicates the scaled value of the TXOP_DURATION |
| | B7 | Coding | 1 | Indicates whether BCC or LDPC is used:<br>  Set to 0 to indicate BCC<br>  Set to 1 to indicate LDPC |
| | B8 | LDPC Extra Symbol Segment | 1 | Indicates the presence of the extra OFDM symbol segment for LDPC.<br>  Set to 1 if an extra OFDM symbol segment for LDPC is present<br>  Set to 0 if an extra OFDM symbol segment for LDPC is not present<br>Reserved and set to 1 when the Coding field is 0. |
| | B9 | STBC | 1 | If the DCM field is 0, then set to 1 if space time block coding is used. Neither DCM nor STBC shall be applied when both the DCM field and STBC field are set to 1. (#12884)<br>Set to 0 otherwise. |
| | B10 | TxBF | 1 | Set to 1 if a Beamforming steering matrix if applied to the waveform in an SU transmission<br>Set to 0 otherwise |
| | B11-B12 | Pre-FEC Padding Factor | 2 | Indicates the pre-FEC padding factor<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B13 | PE Disambiguity | 1 | Indicate PE Disambiguity as defined in 28.3.12 (Packet extension) |
| | B14 | Reserved | 1 | Reserved and set to 1 |

APPARATUS AND METHOD FOR ADAPTIVE CONTENTION WINDOW (ACW)

BACKGROUND

Field

The described embodiments generally relate to channel access and compatibility with legacy IEEE 802.11 systems in wireless communications.

Related Art

In congested wireless local area networks (WLANs) where a high number of WLAN stations share the WLAN medium, collision probabilities are relatively high. Therefore, channel capacity is not used efficiently and latency increases quickly. Accordingly, WLAN medium is not useable for latency sensitive applications (e.g., video and/or audio streaming.)

SUMMARY

Some embodiments include an electronic device, method, and computer program product for adaptive contention window (ACW) channel access in a wireless local area network (WLAN). Some embodiments enable improved aggregated throughput and improved average latency in a communication channel. Wireless electronic devices may implement ACW channel access that improves channel capacity and enables latency sensitive applications (e.g., video and/or audio streaming), especially when all wireless electronic devices operating on the channel as well as those in proximity utilize ACW channel access. For example, an access point (AP) may detect when a WLAN station and/or a WLAN station in proximity are utilizing ACW channel access to obtain a transmit opportunity (TXOP). A TXOP is a time interval during which a WLAN station may transmit data on the channel. Based on the detection, the AP can instruct an associated WLAN station to: use ACW channel access to obtain a TXOP; use ACW channel access or a different type of channel access to obtain a TXOP as needed; disassociate with the AP and associate with a different AP; or use a different channel access method to obtain a TXOP.

A WLAN station may include a smart phone, tablet, or laptop. For convenience, a station herein refers to a WLAN station. In some embodiments, a station may be configured to receive a contention window (CW) minimum value, and a CW maximum value (e.g., from an AP), and determine a CW error value based at least on the CW minimum and CW maximum values, where the CW error value is used to enable ACW channel access. The station may set a first CW value between 0 and the CW minimum value, use a transceiver to transmit first data at a time determined based at least in part on the first CW value, determine that the first data transmission did not experience a collision, and set a second CW value equal to (CW value −1)/2, where the CW value is the first CW value The station may determine a CW error exponent, CW_ERR_EXP, that includes an average of: an exponent of the CW minimum value, CW_MIN_EXP, and an exponent of the CW maximum value, CW_MAX_EXP. Accordingly, the station may calculate the following:

CW_ERR_EXP=(CW_MIN_EXP+CW_MAX_EXP)/2, where

CW error value=2EXP(CW_ERR_EXP)−1.

The station may transmit second data using the transceiver, determine that the second data transmission experienced a collision, where the CW value is greater than or equal to the CW error value, and set a third CW value equal to [2*(CW value)+1], where CW value is the second CW value. In some embodiments the station may transmit second data using the transceiver, determine that the second data transmission experienced a collision, where the second CW value is less than the CW error value, and set a third CW value to the CW error value.

In some embodiments the station may receive from an AP, a first indication to utilize ACW to obtain a TXOP. The station may receive a second indication from a non-ACW station in proximity, and transmit a third indication to the AP that the non-ACW station is present. In response to transmitting the third indication, the station may receive an indication to use ACW channel access and switch to enhanced distributed channel access (EDCA) as needed. In some embodiments the station may determine a change in throughput, latency, or a number of non-ACW stations present, where the determination is based at least on a corresponding threshold being satisfied, and utilize EDCA to obtain a TXOP.

In response to transmitting the third indication, the station may receive a recommendation from the AP, to associate with a different AP, and subsequently the station may associate with the different AP. In some embodiments, in response to transmitting the third indication, the station may transmit to the AP a schedule indicating when the station will be present to the AP (e.g., active on the operating channel of the AP), and operate on a different channel for non-ACW communications during the times when the station is not present to the AP. In response to transmitting the third indication, the station may receive a fourth indication from the AP to utilize EDCA, and utilize EDCA to obtain a TXOP.

In some embodiments, a station such as an AP may transmit the following to a station (e.g., a smart phone, tablet or laptop): a CW minimum value and a CW maximum value that are used to enable ACW. The AP may transmit a first indication that the station should utilize ACW channel access to obtain a TXOP. In some embodiments, the AP may receive a second indication that a non-ACW station is present and based on the second indication, the AP may transmit a recommendation to the second station from which the second indication is received. In some embodiments the recommendation indicates that EDCA may be used to obtain the TXOP.

In some embodiments the AP receives a schedule from the second station indicating when the second station will be available to utilize ACW channel access. In some embodiments the recommendation includes instructions for the second station to associate with a different AP, and where the different AP supports at least a different channel access for obtaining a TXOP (e.g., the different AP may support EDCA.) In some embodiments the AP may change the channel of operation to a different frequency to support ACW channel access among associated stations not including the second station. In some embodiments the recommendation includes a third indication for that station to utilize EDCA to obtain a TXOP.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

FIG. 6 illustrates an example High Efficiency (HE) structure that supports ACW channel access, according to some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments enable communicating wireless local area network (WLAN) electronic devices to improve aggregated throughput and improve average latency in a WLAN communication channel compared to other channel access methods like enhanced distributed channel access (EDCA). The WLAN electronic devices may implement a WLAN access algorithm called adaptive contention window (ACW) channel access that improves channel capacity and enables latency sensitive applications (e.g., video and/or audio streaming), especially when all WLAN electronic devices operating on the channel as well as those in proximity utilize ACW channel access. Some embodiments detect when associated WLAN stations as well as WLAN stations in proximity are utilizing ACW channel access or EDCA to obtain a transmit opportunity (TXOP). Based on the detection, an access point (AP) can direct an associated WLAN station to: use ACW channel access to obtain a TXOP, use ACW channel access or EDCA as needed to obtain a TXOP, disassociate with the AP and associate with a different AP, or use EDCA to obtain a TXOP.

Figure 1:
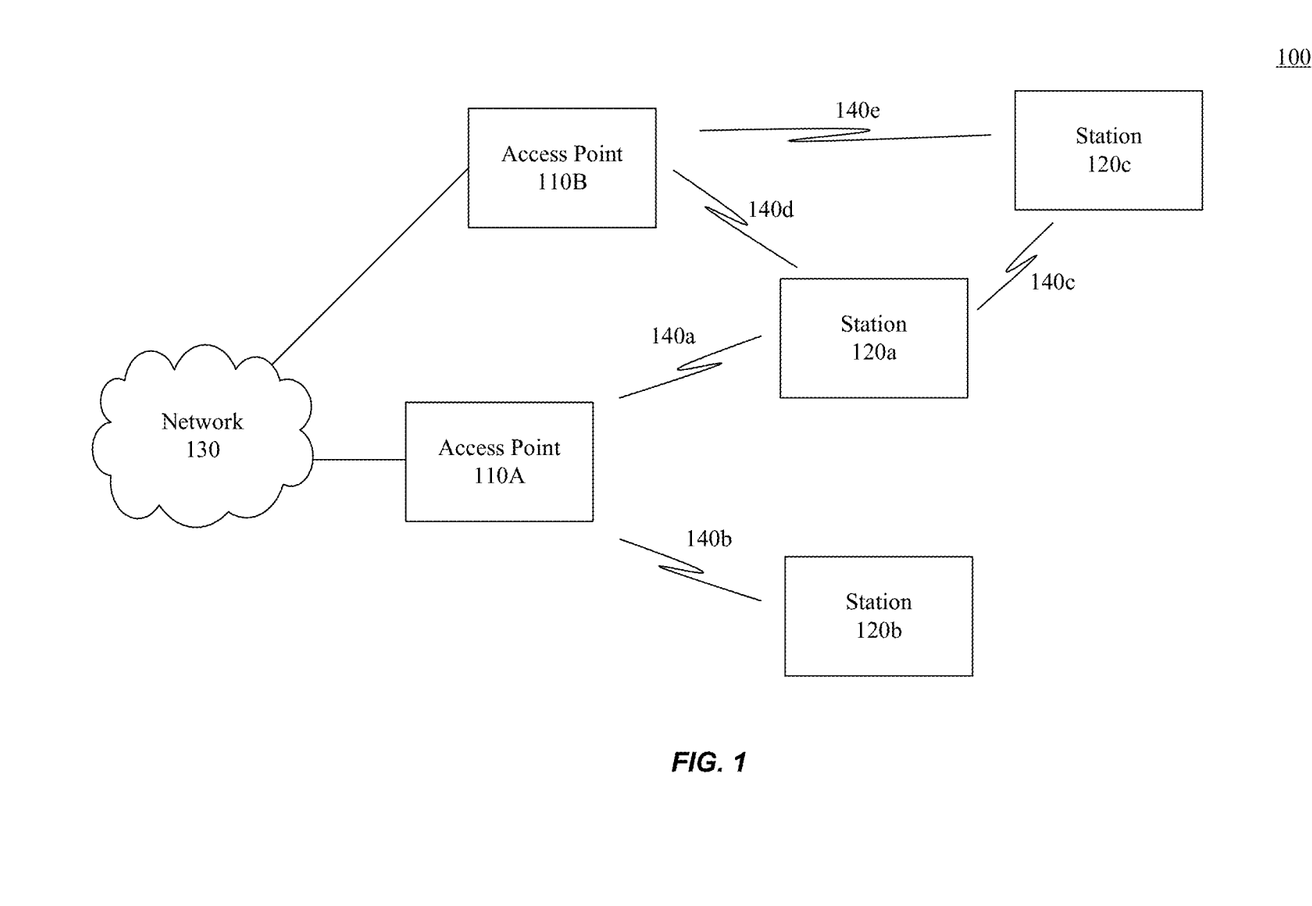
FIG. 1 illustrates an example system implementing an adaptive contention window (ACW) channel access, according to some embodiments of the disclosure.

FIG. 1 illustrates an example system 100 implementing an adaptive contention window (ACW) channel access, according to some embodiments of the disclosure. Example system 100 is provided for the purpose of illustration only and is not limiting of the disclosed embodiments. System 100 may include but is not limited to stations 120, access points 110, and network 130. Stations 120a-120c may include but are not limited to Wireless Local Area Network (WLAN) stations such as wireless communication devices, smart phones, laptops, desktops, tablets, personal assistants, monitors, and televisions. Example uses may include channel access for station 120 to support latency sensitive applications (e.g., video and/or audio streaming). Access point (AP) 110 may include but are not limited to WLAN electronic devices such as a wireless router, a wearable device (e.g., a smart watch), a wireless communication device (e.g., a smart phone), or a combination thereof. Network 130 may be the Internet and/or a WLAN. Station 120 communications are shown as wireless communications 140.

Figure 2:
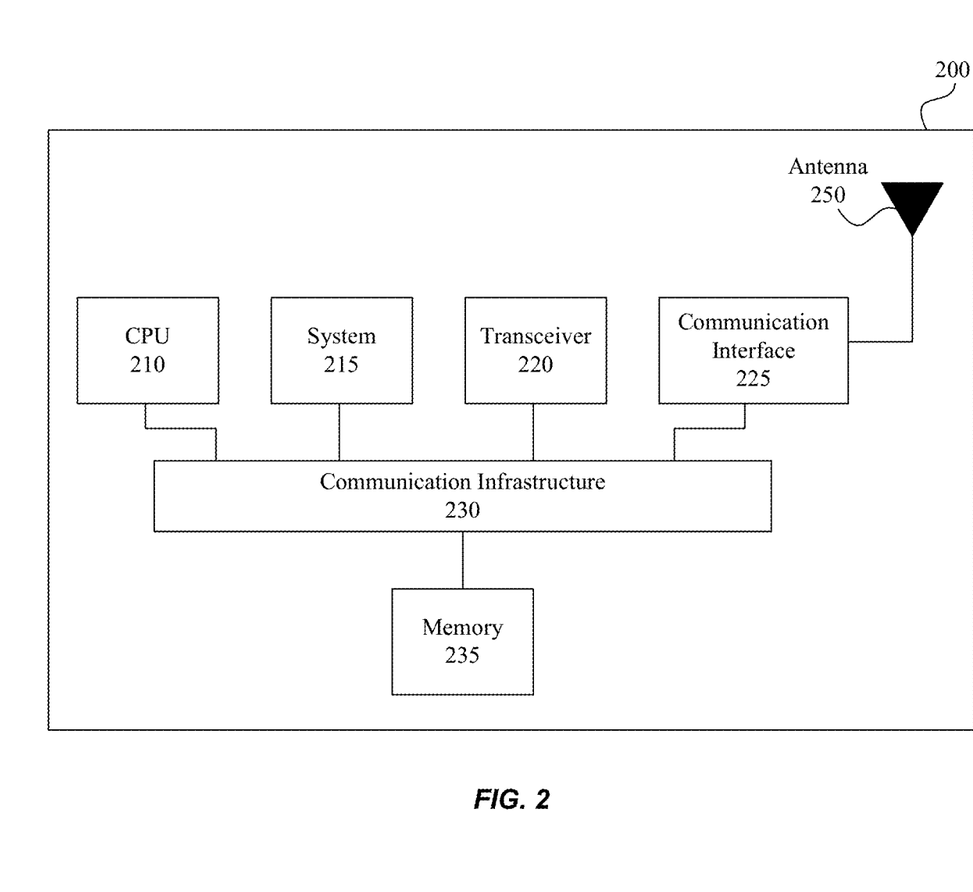
FIG. 2 illustrates a block diagram of an example wireless system supporting ACW channel access, according to some embodiments of the disclosure.

FIG. 2 illustrates a block diagram of an example wireless system 200 supporting ACW channel access, according to some embodiments of the disclosure. System 200 may be any of the electronic devices (e.g., 110, 120) of system 100. System 200 includes central processing unit (CPU) 210, system 215, transceiver 220, communication interface 225, communication infrastructure 230, memory 235, and antenna 250. Memory 235 may include random access memory (RAM) and/or cache, and may include control logic (e.g., computer software) and/or data. CPU 210 together with instructions stored in memory 235 perform operations enabling adaptive contention window (ACW) channel access. System 215 may be a system on a chip that includes one or more processors, memory including cache, and instructions stored in the memory that together with the one or more processors perform operations enabling ACW channel access. In some embodiments CPU 210, instructions in memory 235, and system 215 together perform operations enabling ACW. Transceiver 220 transmits and receives communications signals including packet structures that support ACW channel access according to some embodiments, and may be coupled to antenna 250. Communication interface 225 allows system 200 to communicate with other devices that may be wired and/or wireless. Communication infrastructure 230 may be a bus. Antenna 250 may include one or more antennas that may be the same or different types.

WLANs with a high number of stations using EDCA and sharing the communication channel experience congestion such that low latency applications (e.g., audio and/or video streaming) cannot be supported. Each station has a contention window (CW) value that represents a time that the station waits before obtaining a TXOP. Under these conditions, station experiences a CW value that fluctuates between a minimum value, CW_MIN, and a maximum value, CW_MAX, without converging to a desired value. The values of CW_MIN and CW_MAX may be set by the AP or by agreement (for ad-hoc networks.)

For example, if twenty stations 120 (only 120a and 120b are shown in FIG. 1) associate with AP 110A and CW_MIN=15, assume that both stations 120a and 120b choose CW value=15. Accordingly, both stations 120a and 120b count down 15 idle time slots for a TXOP, after which they transmit at substantially the same time, resulting in a collision. Stations 120a and 120b will each double their CW value and choose a CW value between 1-31 time slots. In time, station 120a has a successful transmission, and the CW value is set to the minimum CW value, CW_MIN=15. Since any of the 20 stations 120 that have a successful transmission set their respective CW values to CW_MIN, a collision with one of the other 20 stations 120a is highly likely, resulting in the CW value being doubled again. Thus, station 120a will again double the CW value to wait for a longer time before obtaining a TXOP, and the applications running on station 120*a* (and other stations 120 associated with AP 110A) will experience delays as the CW value fluctuates between CW_MIN and CW_MAX without converging to a desired value.

Thus, in congested WLANs using EDCA, the collision probability remains high, the channel capacity is not used efficiently, and latency increases. As a result, when station 120*a* uses a latency sensitive application (e.g., video/audio streaming application), the user experience can be unsatisfactory because of the poor latency and throughput.

Some embodiments determine a CW value according to WLAN channel conditions for a desired performance regardless of the number of stations on the WLAN channel (e.g., the number of stations 120 associated with an AP 110), where the desired performance accommodates bandwidth and latency factors for latency sensitive applications. In some embodiments a collision rate in the order of 8% is desired. Accordingly, a desired CW value on a given channel is one that brings the collision rate close to 8% or below. In some embodiments the ACW channel access balances the value of CW according to a channel load that is reflected in the observed transmit (TX) collision ratio. The more contention on the channel, the higher the CW values should be on average. For example, following a failed exchange, a CW value may be increased to above the mid-CW value range to support rebalancing about a desired CW value. And after a successful exchange, the value of CW should decrease progressively to keep the CW value balanced around a desired value per the desired collision rate. In particular, the CW value should not return to a set value such as the CW_MIN for all stations as that leads back to a high collision rate (e.g., EDCA). To maintain a uniform bandwidth distribution, some embodiments encourage devices to adopt an adaptive CW access procedure such as ACW channel access.

Figure 3:
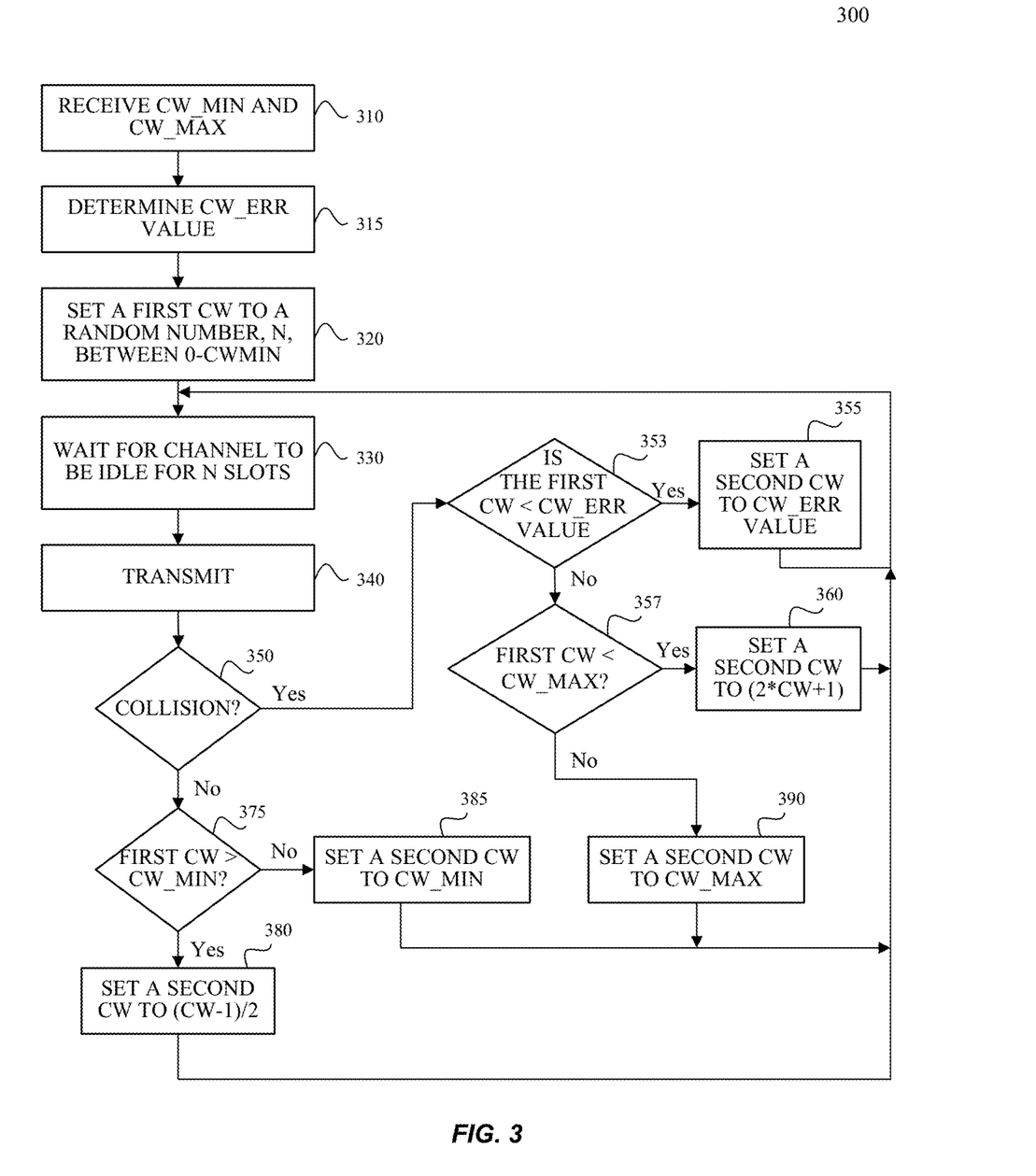
FIG. 3 illustrates an example method performed by an ACW-capable station, according to some embodiments of the disclosure.

FIG. 3 illustrates an example method 300 performed by an ACW-capable station, according to some embodiments of the disclosure. As a convenience and not a limitation, FIG. 3 may be described with regard to elements of FIGS. 1 and 2. Method 300 may be performed by a station 120 of FIG. 1 and/or system 200 of FIG. 2.

At 310, system 200 may receive CW_MIN and CW_MAX from AP 110, where AP 110 advertises a CW_MIN and a CW_MAX per access category (e.g., per quality of service (QoS) category). For example, station 120*a* associated with AP 110A may receive CW_MIN and CW_MAX from AP 110A. For ad hoc networks between stations 120*a* and 120*c*, values of respective CW_MIN and CW_MAX may be a default value, for example set by one or more WLAN standards. CW_MIN and CW_MAX values may depend on QoS configurations.

Using the example of twenty stations 120 associated with AP 110A, assume the following: stations 120 utilize ACW channel access, CW_MIN=15 or 2EXP(4)−1, and CW_MAX=1023 or 2EXP(10)−1. (Herein: 2EXP(x) is the mathematical construct $2^x$).

At 315, system 200 may determine a CW error value, CW_ERR value, where the CW_ERR value is the minimal CW value used following a failed communication (e.g., a TXOP that experienced a collision with another TXOP. The CW_ERR value is based at least on the exponent of CW_ERR, herein CW_ERR_EXP, where the CW_ERR_EXP is based at least on the exponents of CW_MIN and CW_MAX, CW_MIN_EXP and CW_MAX_EXP respectively, as shown below:

CW_ERR_EXP=(CW_MIN_EXP+CW_MAX_EXP)/2, and

CW_ERR=2EXP(CW_ERR_EXP)−1.

According to the example above,

CW_MIN_EXP=4, and CW_MAX_EXP=10.

Thus, CW_ERR_EXP=(4+10)/2=7.

Accordingly, CW_ERR=2EXP(7)−1. Thus, CW_ERR=127.

At 320, system 200 may set CW value to a random number, N, between zero and CW_MIN. In the example, a first CW value may be randomly chosen to be N between zero and 15. Assume N=15.

At 330, system 200 may wait for the communication channel to be idle for CW slots equal to the first CW value chosen in step 320. In the example assuming N=15, system 200 waits for 15 idle slots before transmitting information.

At 340, system 200 obtains a TXOP and transmits information on the communication channel.

At 350, system 200 determines whether a collision occurred with the transmitted data. If a collision occurred, method 300 proceeds to 353. Otherwise, method 350 proceeds to 375.

At 353, after a collision, system 200 determines whether the value of the first CW is less than the value of CW_ERR. Thus, method 300 determines what the next value of CW will be based at least on a relationship between the value of the first CW before the collision and the value of CW_ERR. When the value of the first CW is less than the value of CW_ERR, method 300 proceeds to 355. Otherwise, method 300 proceeds to 357. In the example, if a collision is assumed to have occurred, the value of the first CW=15 and the value of CW_ERR=127. Thus, method 300 proceeds to 355. Note that this determination is not made in EDCA. First, EDCA does not determine a value of CW_ERR. Second, EDCA does not determine a relationship between the value of the first CW before the collision and CW_ERR. Instead, EDCA merely sets a second CW value to double the value of the first CW value plus 1, after a collision.

At 355, system 200 sets the value of CW (e.g., a second CW value) to the value of CW_ERR, and method 300 returns to 330. In the example, the value of CW, the second CW value, is set to 127 and method 300 returns to 330. Note that this is different than what would occur with EDCA, as after a collision, EDCA would have set the second CW value to 31 (e.g., 2*CW+1).

Returning to 357 where the first CW value is greater than or equal to the value of CW_ERR, system 200 determines whether the first CW value is less than CW_MAX. When the first CW value is less than CW_MAX, method 300 proceeds to 360. Otherwise, method 300 proceeds to 390.

At 360 where the first CW value is less than CW_MAX, system 200 sets the second CW value to (2*CW+1) where CW is the current CW value, which in this case is the first CW value. This step was not applicable in the example because the value of CW=15 and CW_ERR=127. Method 300 returns to 330 where the value of N is now equal to the second CW value. Accordingly, at subsequent 353, a determination is made whether the second CW value is less than the current CW error value. And at subsequent 355, 360, 380, 385, or 390, a third CW value would be set, and so on. For example, at the subsequent 360, a third CW value may be set to (2*CW+1) where CW is the current CW value, the second CW value.

Returning to 390 where the first CW value is greater than or equal to CW_MAX, system 200 sets the second CW value to CW_MAX. Thus, CW_MAX is the ceiling value for the second CW value. Method 300 returns to 330.

Returning to 375, when the transmission is successful (e.g., no collision occurred) system 200 determines whether the first CW value is greater than CW_MIN. When the first CW value is greater than CW_MIN, method 300 proceeds to 380. Otherwise, method 300 proceeds to 385.

At 380 where the first CW value is greater than CW_MIN, system 200 may halve the value of the first CW value. Accordingly, system 200 may set a second CW value to (CW-1)/2 where CW is the current CW value, namely the first CW value. Thus, method 300 uses at least the first CW value before the successful transmission to determine a next CW value. This is different than EDCA, as after a successful transmission EDCA would simply set the second CW value to CW_MIN for each station 120 that has a successful transmission, regardless of what the first CW value was before a successful transmission. In the example, EDCA would set the second CW value to 15 for each station 120 that achieved a successful transmission. In the example of twenty stations 120 associated with AP 110A, the probabilities of another collision using EDCA would be higher than using ACW channel access. Method 300 returns to 330.

Note that 380 is not applicable in the example since the first CW value and CW_MIN=15. Thus after 375, method 300 would proceed to 385.

Returning to 385 where the first CW value is less than or equal to CW_MIN, system 200 sets a second CW value to CW_MIN. Thus, CW_MIN is the floor value for the second CW value. In the example, the first CW value=15 and CW_MIN=15. Thus, the second CW value would be set to CW_MIN or 15. Method 300 returns to 330.

When a channel is congested, ACW channel access improves system performance over EDCA when all stations 120 associated with an AP (e.g., AP 110A) use ACW channel access. Some embodiments include control signaling that indicates the following: that an station 120 is capable of ACW channel access; and whether any other stations 120 in its proximity are not ACW-capable. Some embodiments enable a station 120 to determine that other stations 120 in proximity use ACW channel access. Some embodiments enable an AP 110 to provide channel access to stations 120 that utilize latency sensitive applications. The control signaling information may be transmitted in a physical layer preamble of IEEE 802.11 protocol data unit structures.

Figure 4:
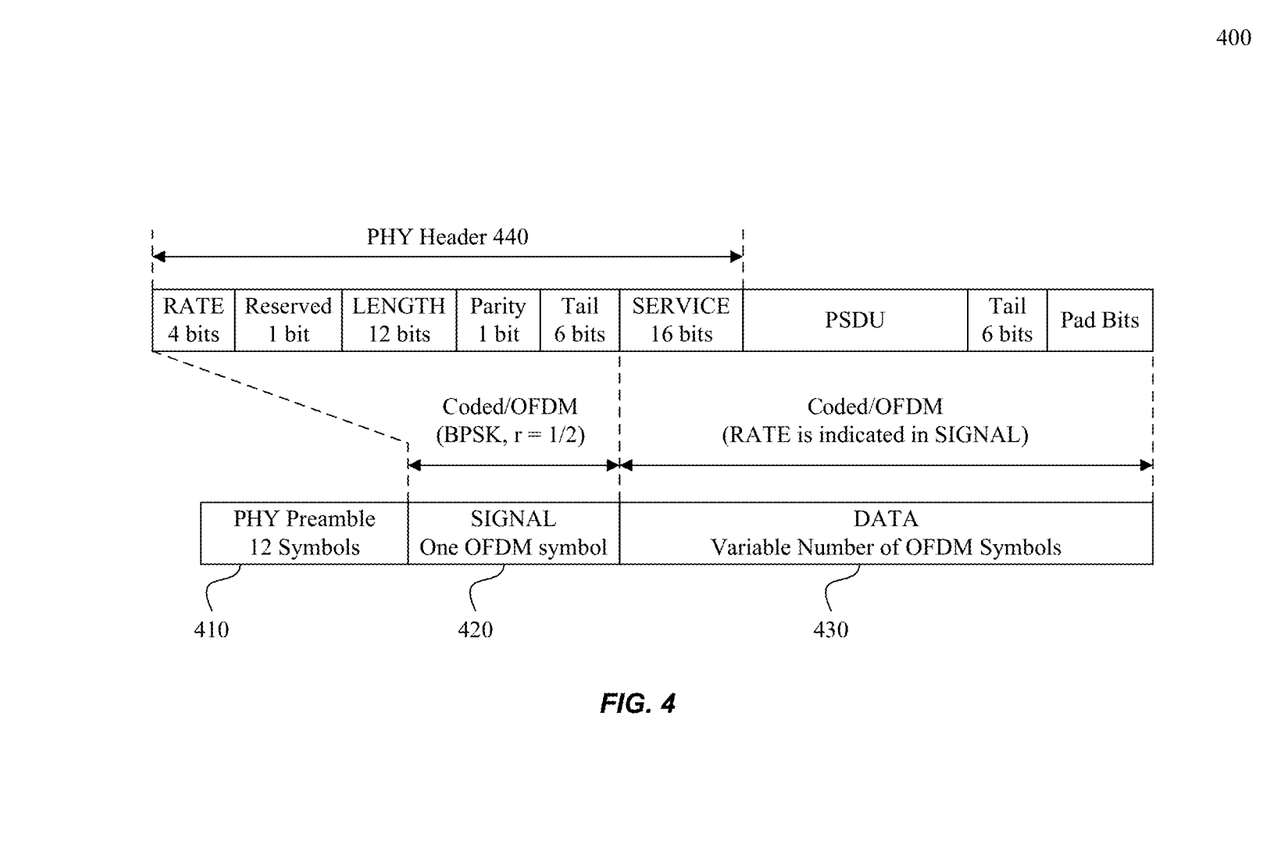
FIG. 4 illustrates an example physical layer conformance procedure (PLCP) protocol data unit (PPDU) structure that supports ACW channel access, according to some embodiments of the disclosure.

FIG. 4 illustrates a physical layer conformance procedure (PLCP) protocol data unit (PPDU) structure 400 that supports ACW channel access, according to some embodiments of the disclosure. PPDU structure 400 comprises PHY Preamble 410, signal 420, and data 430, and PHY Header 440. Some embodiments include the ACW channel access control signaling in PHY Preamble 410.

Figure 5A:
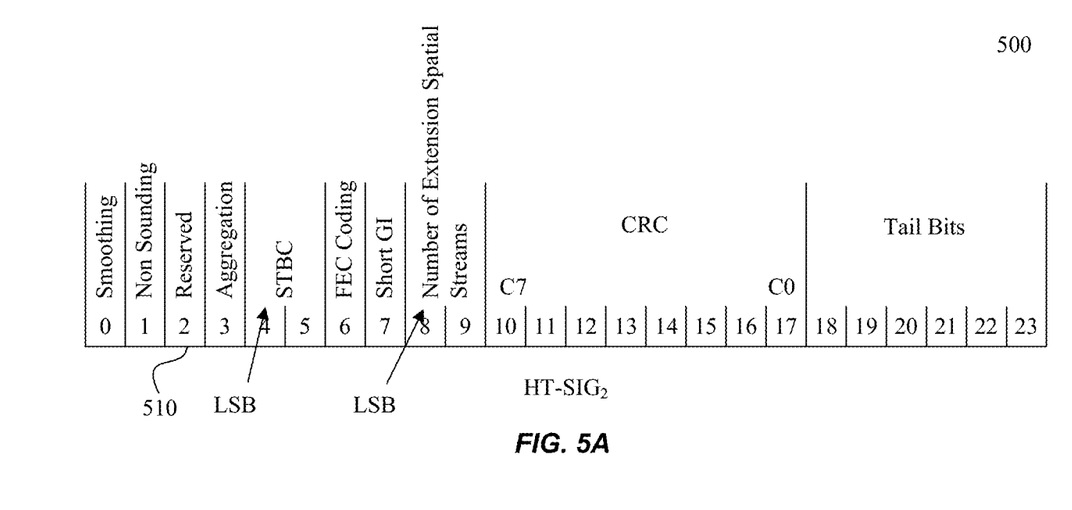
FIGS. 5A and 5B illustrate examples of High Throughput (HT) and Very High Throughput (VHT) structures that support ACW channel access, according to some embodiments of the disclosure.
Figure 5B:
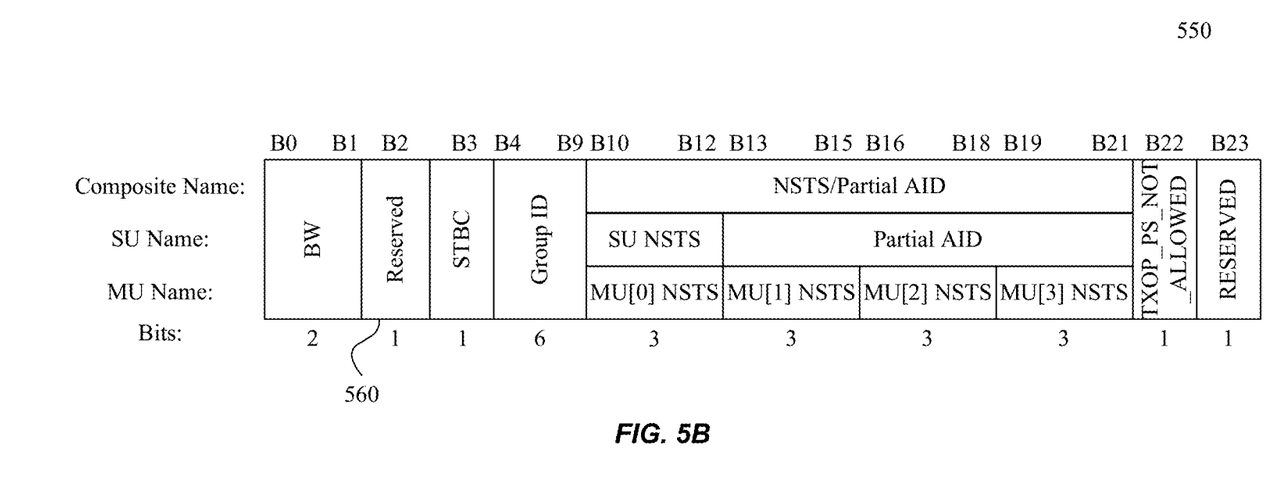

FIGS. 5A, 5B, and 6 indicate where in current preambles (e.g., legacy standard preambles) a station transmitting a packet could indicate the use of ACW for channel access. Certain bits are reserved by legacy standard (e.g., set to "0" by non-ACW capable stations) and may be used by ACW stations (e.g., set to "1" by ACW stations). FIGS. 5A and 5B illustrate High Throughput (HT) structure 500 and Very High Throughput (VHT) structure 550 that support ACW channel access, according to some embodiments of the disclosure. As a convenience and not a limitation, FIGS. 5A, 5B may be described with regard to elements of FIG. 1. In some embodiments, HT structure 500 may use Reserved bit 2, field 510, to indicate that ACW channel access is or is not used for a particular station 120. For example, when station 120 has used ACW channel access to obtain a TXOP, station 120 may set field 510 to '1'. When station 120 has used a different channel access method to obtain a TXOP, station 120 may set field 510 to '0'. In some embodiments, VHT structure 550 may use Reserved bit 2, field 560, to indicate that ACW channel access is or is not used. For example, when station 120 has used ACW channel access to obtain a TXOP, station 120 may set field 560 to '1'. When station 120 has used a different channel access method to obtain a TXOP, station 120 may set field 560 to '0'.

FIG. 6 illustrates a High Efficiency (HE) structure 600 that supports ACW channel access, according to some embodiments of the disclosure. As a convenience and not a limitation, FIG. 6 may be described with regard to elements of FIG. 1. In some embodiments, HT structure 600 may use Reserved bit 14, field 610, to indicate that ACW channel access is or is not used for a particular station 120. For example, when station 120 has used ACW channel access to obtain a TXOP, station 120 may set field 610 to '1'. When station 120 has used a different channel access method to obtain a TXOP, station 120 may set field 610 to '0'.

Figure 7:
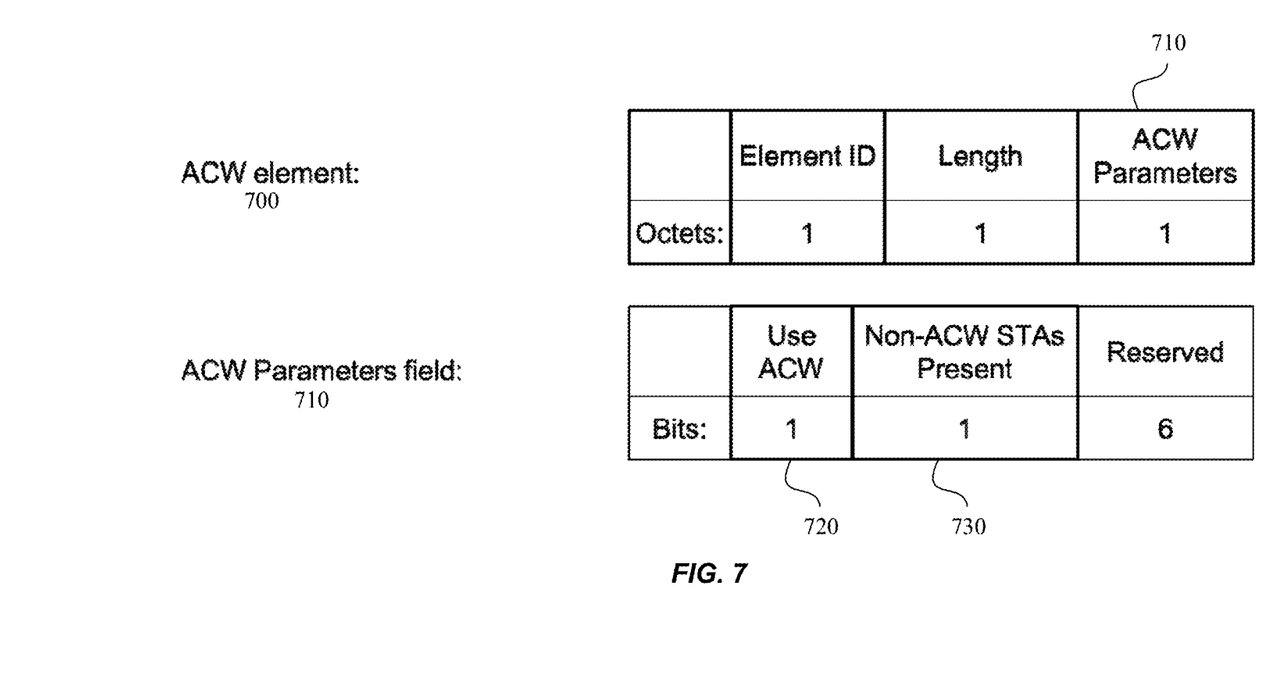
FIG. 7 illustrates an example ACW element, according to some embodiments of the disclosure.

AP 110 instructs associated stations 120 whether ACW channel access should be used. For example, AP 110A may append an ACW element in beacons and probe responses to advertise whether ACW channel access is supported by AP 110A and whether non-ACW stations have been detected. FIG. 7 illustrates an ACW element 700, according to some embodiments of the disclosure. As a convenience and not a limitation, FIG. 7 may be described with regard to elements of FIG. 1. ACW element 700 may include 3 octets that identify an element ID, a length, and an ACW parameters field 710. ACW parameters field 710 may include Use ACW bit 720 and Non-ACW STAs Present bit 730. AP 110 may transmit Use ACW bit 720 set to '1' to instruct associated stations 120 to use ACW channel access to obtain TXOPs. AP 110 may transmit Use ACW bit 720 set to '0' to instruct associated stations 120 to use a different channel access such as EDCA to obtain TXOPs.

AP 110 may transmit Non-ACW STAs Present 730 bit set to '1' to indicate that AP 110 has received an indication from an associated station 120b that the associated station 120b is not ACW capable. In another example, AP 110A may transmit Non-ACW STAs Present bit 730 set to '1' to indicate that AP 110A has received an indication from an associated station 120a that the associated station 120a has received an indication that station 120c, in proximity to station 120a, is not ACW capable. Otherwise, AP 110 may transmit Non-ACW STAs Present bit 730 set to '0' indicating that associated stations 120, and stations 120 in proximity are ACW capable.

Figure 8:
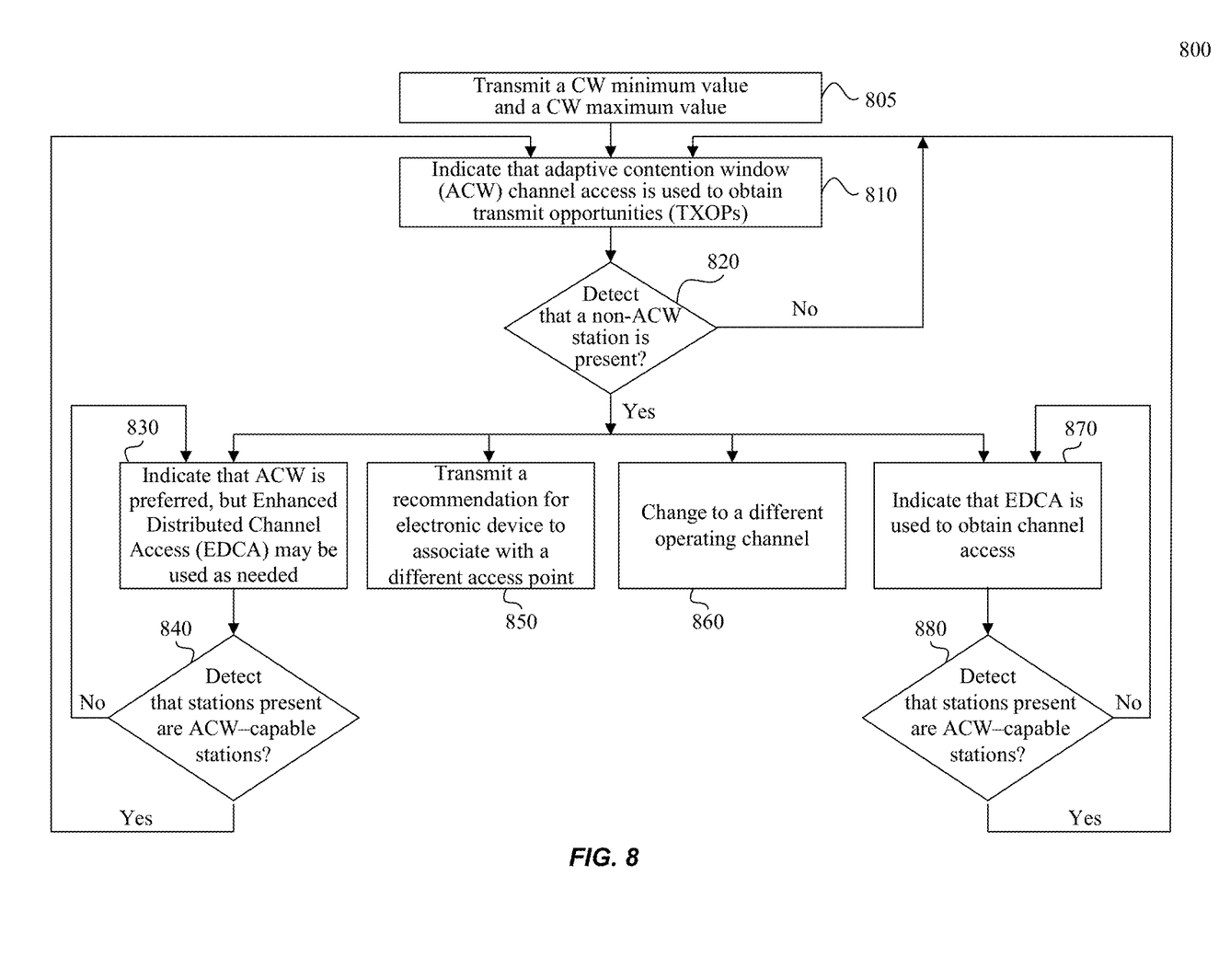
FIG. 8 illustrates an example method for an access point supporting ACW channel access, according to some embodiments of the disclosure.

FIG. 8 illustrates an example method 800 for an access point supporting ACW channel access, according to some embodiments of the disclosure. As a convenience and not a limitation, FIG. 8 may be described with regard to elements of FIGS. 1-7. Method 800 may be performed by an AP 110 of FIG. 1 and/or system 200 of FIG. 2. As an example, method 800 is described from the perspective of AP 110A. Stations 120 using ACW channel access experience lower latency and higher throughput when the associated stations 120 all utilize ACW channel access. Accordingly, when a station 120 (e.g., station 120b) does not utilize ACW channel access or associated station 120a is in proximity to a non-ACW station 120 such as station 120c, an AP 110 may perform the following: allow station 120a to use EDCA as needed; steer stations 120b and/or 120a to a different AP (e.g., AP 110B); change to a different operating channel with which the stations 120*b* and/or 120*a* are not associated; and/or indicate that an associated station 120*a* and/or 120*b* utilize a different channel access method such as EDCA. These are described below.

At 805, AP 110A transmits a CW minimum and a CW maximum value. For example, AP 110A may transmit the CW minimum and CW maximum values in a beacon.

At 810, AP 110A instructs associated stations 120*a* and 120*b* that ACW channel access is to be used to obtain a transmit opportunity (TXOP). For example, AP 110A may advertise Use ACW 720 bit set to '1' and Non-ACW STAs Present bit 730 set to '0' in beacons and probe responses.

At 820, AP 110 may detect that a non-ACW station is present. For example, AP 110A may receive an indication from station 120*b* that station 120*b* does not support ACW channel access. The indication received may include Use ACW bit 720 set to '0'. In another example, AP 110A may receive an indication from station 120*a* that is using ACW channel access, that station 120*a* is in proximity with station 120*c* that does not support ACW channel access. The indication received may include Use ACW bit 720 set to '1' and Non-ACW STAs Present bit 730 set to '1'. When an indication is received that a non-ACW station is in proximity or is present, method 800 proceeds to 830, 850, 860, or 870. Otherwise, when associated stations 120 and those in proximity use ACW channel access, method 800 returns to 810.

At 830, AP 110A may indicate that ACW channel access is preferred, but enhanced distributed channel access (EDCA) may be used as needed. For example, if station 120*a* experiences a negative change in throughput and/or latency, station 120 may use EDCA. AP 110A may advertise in beacons and probe responses the following: Use ACW bit 720 set to '1' and Non-ACW STAs Present bit 730 set to '1'. In some embodiments if AP 110A determines that a number of stations 120 using EDCA satisfy a threshold value, AP 110A may transition to 850, 860, or 870. Method 800 proceeds to 840.

At 840, AP 110 determines whether stations 120 associated and/or present are ACW-capable stations (e.g., non-ACW station(s) are no longer present.) For example, AP 110A may receive probe requests from station 120*a* and 120*b* where Use ACW 720 bit is set to '1', and Non-ACW STAs Present bit 730 set to '0'. When a determination is made that non-ACW station(s) are no longer present, method 800 returns to 810. Otherwise, when non-ACW station(s) are present or in proximity, method 800 returns to 830.

At 850, AP 110A transmits a recommendation to any station 120 from which an indication of a non-ACW station was received at 820, to associate with a different AP. For example, AP 110A's basic service set (BSS) may be directed to enabling ACW channel access for associated stations 120*a* and 120*b*. If station 120*a* and/or 120*b* are non-ACW stations or in proximity to non-ACW stations, AP 110A may steer station 120*a* and/or 120*b* to a different AP 110 and BSS that supports a different method for channel access, such as EDCA. For example, AP 110A may use BSS Transition Management Request and Response frames to steer station 120*a* to AP 110B that may support EDCA.

At 860, AP 110A may change to a different operating channel with which the stations 120*b* (e.g., a station not utilizing ACW channel access) and/or 120*a* (e.g., an ACW station in proximity with station 120*c* that is not utilizing ACW channel access) are not currently associated. In an example, AP 110A may transmit a beacon that includes the different operating channel. Accordingly, stations 120*b* and/or 120*a* may search for another AP 110 with which to associate. Thus, AP 110A ensures ACW channel access and throughputs within its BSS.

At 870, AP 110A may instruct stations 120 that a different channel access method such as EDCA is used to obtain channel access. For example, AP 110A may advertise in beacons and probe responses: Use ACW bit 720 set to '0'. Method 800 proceeds to 880.

At 880, AP110 determines whether stations 120 in proximity are ACW-capable stations (e.g., stations 120*a* and 120*b*) and/or a non-ACW station in proximity is no longer present (e.g., station 120*a* indicates that station 120*c* is no longer present.) For example, AP 110A may receive probe requests from station 120*a* and 120*b* where Use ACW 720 bit is set to '1', and Non-ACW STAs Present bit 730 set to '0'. When a determination is made that associated stations 120*a*, 120*b*, and stations 120 in proximity (e.g., station 120*c*) are ACW-capable stations, method 800 returns to 810. When the non-ACW capable stations are still present, method 800 returns to 870.

Figure 9:
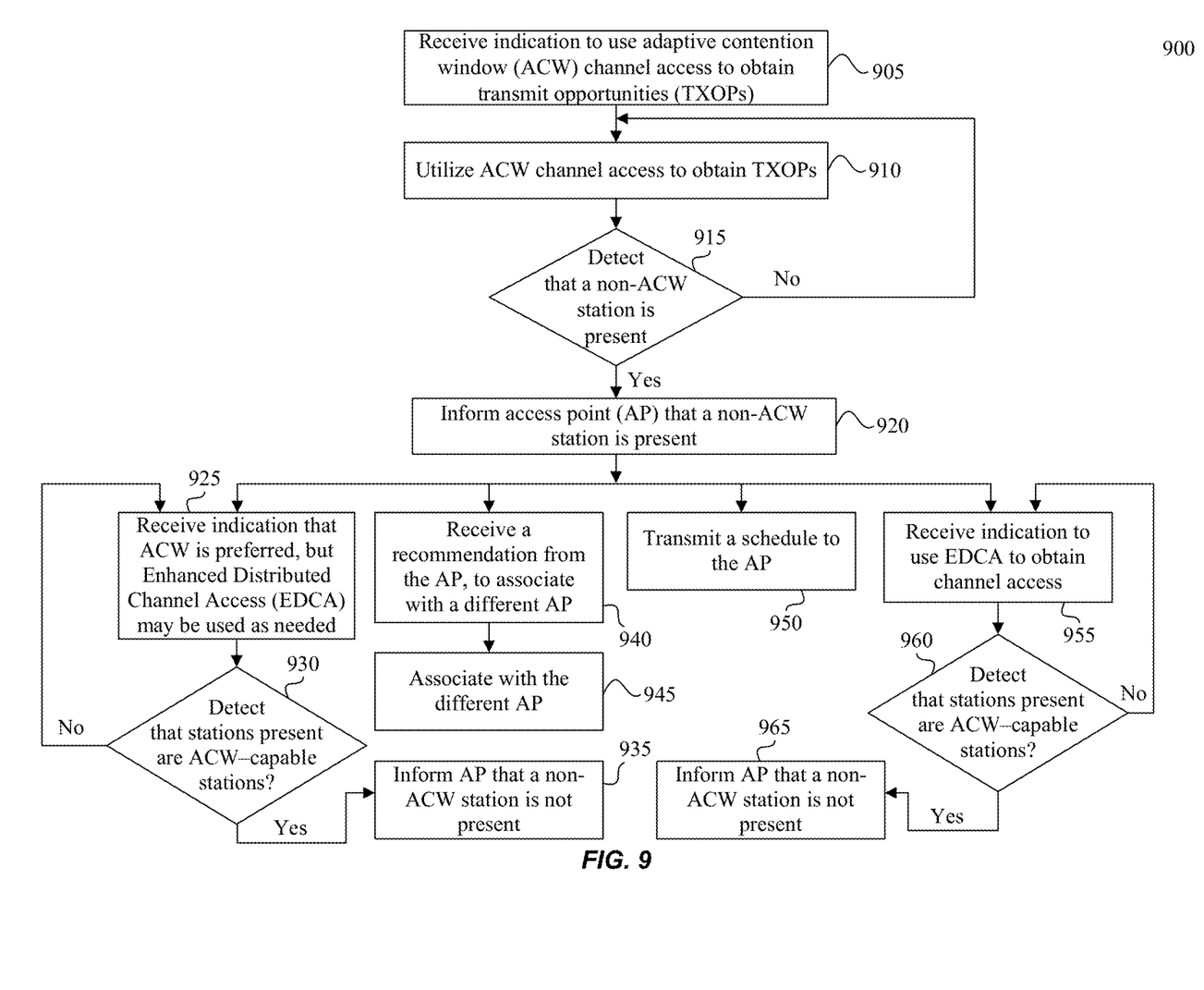
FIG. 9 illustrates an example method for a station supporting ACW channel access, according to some elements of the disclosure.

FIG. 9 illustrates an example method 900 for a station 120 supporting ACW channel access, according to some elements of the disclosure. As a convenience and not a limitation, FIG. 9 may be described with regard to elements of FIGS. 1-8. Method 900 may be performed by a station 120 of FIG. 1 and/or system 200 of FIG. 2. As an example, method 900 is described from the perspective of station 120*a*. As noted above, stations 120 experience lower latency and higher throughput when the associated stations 120 all utilize ACW channel access. Accordingly, when an station 120*a* does not utilize ACW channel access or station 120*a* is in proximity to a non-ACW station 120 such as station 120*c*, station 120*a* may: receive instructions from AP 110A to use EDCA as needed; receive instructions from AP 110A to associate with a different AP, e.g., AP 110B; notify AP 110A when station 120*a* is active with regards to AP 11A's BSS; and/or receive instructions from AP 110A that station 120*a* should utilize a different channel access method such as EDCA. These are described below.

At 905, station 120 may receive an indication to use adaptive contention window (ACW) channel access to obtain a transmit opportunity (TXOP). For example, station 120*a* may receive an indication to use ACW channel access from AP 110A. For example, AP110A may advertise Use ACW 720 bit set to '1' and Non-ACW STAs Present bit 730 set to '0' in beacons and/or probe responses.

At 910, station 120 may utilize ACW channel access to obtain TXOPs as described in FIG. 3, method 300.

At 915, station 120 determines whether a non-ACW station is present. For example, station 120*a* may determine whether an indication is received that a non-ACW station (e.g., station 120*c*) is present or in proximity. When a non-ACW station 120*c* is not detected, method 900 returns to 910. For example, station 120*a* receives an indication that station 120*c* is ACW-capable and is using ACW channel access, Use ACW 720 bit set to '1', and Non-ACW STAs Present bit 730 set to '0' in beacons and/or probe responses from station 120*c*. When a non-ACW station is detected, method 900 proceeds to 920. For example, station 120*c* may not be ACW-capable or may be utilizing EDCA. Accordingly, station 120*a* receives Use ACW 720 bit set to '0'; or station 120*c* may be ACW-capable but a peer station 120 (not shown) may be using EDCA, so station 120*a* may receive an indication in beacons and/or probe responses from station 120*c* where Use ACW 720 bit is set to '1' and Non-ACW STAs Present bit 730 is set to '1'.

At 920, station 120 informs AP 110 that a non-ACW station is present. For example, station 120a may transmit Use ACW 720 bit set to '1' and Non-ACW STAs Present bit 730 set to '1' in beacons and/or probe requests to AP 110A. After an indication is transmitted that a non-ACW station is in proximity or is present, method 900 proceeds to 925, 940, 950, or 955.

At 925, in response to informing AP 110 that a non-ACW station is present, station 120 may receive an indication that ACW channel access is preferred, but EDCA may be used as needed. For example, station 120a may receive beacons and/or probe responses from AP 110A where Use ACW 720 bit is set to '1', and Non-ACW STAs Present bit 730 set to '1'. Accordingly, station 120a may use ACW channel access which is preferred unless conditions are detected that warrant a change to a more aggressive channel access method (e.g., EDCA.) For example, if station 120a determines one or more of the following conditions, station 120a may switch from using ACW channel access to EDCA: a change in throughput, e.g., decreasing from 6 Mbps to 3 Mbps; a change in latency for obtaining TXOPs such as an increase; and/or a change in the number of other stations 120 (not shown) in proximity detected that are non-ACW stations, such as an increase. Each of these conditions may be associated with settable threshold values that once satisfied, enable station 120a to change from one channel access method to another. For example, when a condition changes and a corresponding threshold is satisfied, station 120a may revert back to ACW channel access.

At 930, station 120 may subsequently detect that stations present are all ACW-capable stations. For example, station 120 may determine whether subsequent indications that stations (e.g., other stations 120 like 120c) are ACW-capable stations. If station 120a determines that station 120c is an ACW-capable station, then method 900 proceeds to 935. For example, station 120a may receive beacons and/or probe responses from station 120c where Use ACW 720 bit is set to '1', and Non-ACW STAs Present bit 730 set to '0'. If station 120a determines that station 120c or any station 120 in proximity is not ACW-capable, method 900 returns to 925. For example, station 120a may receive beacons and/or probe responses from station 120c where Use ACW 720 bit is set to '0', or Use ACW 720 bit is set to '1', and Non-ACW STAs Present bit 730 set to '1'

At 935, station 120 may inform AP 110 that stations 120 in proximity are ACW-capable devices using ACW channel access (e.g., non-ACW stations are not present). Thus, stations 120 in proximity are using ACW channel access to obtain TXOPs. For example, station 120 may transmit an indication to AP 110A where Use ACW 720 bit is set to '1', and Non-ACW STAs Present bit 730 set to '0'.

At 940, in response to informing AP 110 that a non-ACW station is present, station 120 may receive a recommendation from AP 110 to associate with a different AP 110. For example, station 120a may receive a recommendation from AP 110A to associate with AP 110B, where AP 110B's BSS may support at least another channel access method such as EDCA. Consequently, AP 110A may maintain a BSS that only supports ACW-channel access among all the associated stations 120 (e.g., station 120b and other stations 120 not shown).

At 945, in response to the recommendation received, station 120 may associate with a different AP 110. For example, station 120a may disassociate with AP 110A whose BSS supports ACW channel access and associate with AP 110B whose BSS supports at least a different type of channel access, or a combination of channel access types (e.g., ACW and EDCA).

At 950, in response to informing AP 110 that a non-ACW station is present, station 120 may transmit a schedule to AP 110 where the schedule indicates when station 120 is present (e.g., active) on AP 110's channel. Thus, station 120 uses ACW channel access in accordance with AP 110, and at different times, communicates with other stations 120 via ad hoc networks that may be non-ACW stations or ACW-capable stations that are using a different channel access method like EDCA.

For example, station 120a may provide a schedule to AP 110A indicating when station 120a is operating and potentially trying to obtain TXOPs on the BSS of AP 110A. During the other times, station 120a may be in sleep mode, or may be operating on a different channel for non-ACW channel access with station 120c. Thus, station 120a uses ACW channel access in accordance with AP 110A and communicates with station 120c that may be a non-ACW station or an ACW-capable station that is using a different channel access method.

At 955, in response to informing AP 110 that a non-ACW station is present, station 120 may receive an indication to use a different channel access method than ACW channel access. For example, station 120a may receive an indication from AP 110A to a different channel access method (e.g., EDCA) to obtain TXOPs. The indication may include Use ACW 720 bit is set to '0'.

At 960, station 120 may determine whether subsequent indication(s) are received that stations present are ACW-capable stations, or whether non-ACW stations are still present. For example, station 120a may determine from subsequent indications received that station 120c is no longer present, or is now using ACW channel access, and method 900 proceeds to 965. For example, if station 120c is now using ACW channel access, station 120a may receive an indication from station 120c with Use ACW 720 bit is set to '1', and Non-ACW STAs Present bit 730 set to '0'. If station 120a determines that non-ACW stations are still present, method 900 returns to 955. For example, station 120a may receive another indication from station 120c or an indication from another station 120 (not shown) where Use ACW 720 bit is set to '0', or Use ACW 720 bit is set to '1', and Non-ACW STAs Present bit 730 set to '1'.

At 965, station 120 informs AP 110 that station(s) in proximity are ACW-capable devices. For example, station 120a may transmit an indication to AP 110A that includes Use ACW 720 bit is set to '1', and Non-ACW STAs Present bit 730 set to '0'. Thus, AP 110A can maintain a BSS where associated stations 120 use ACW channel access.

Figure 10:
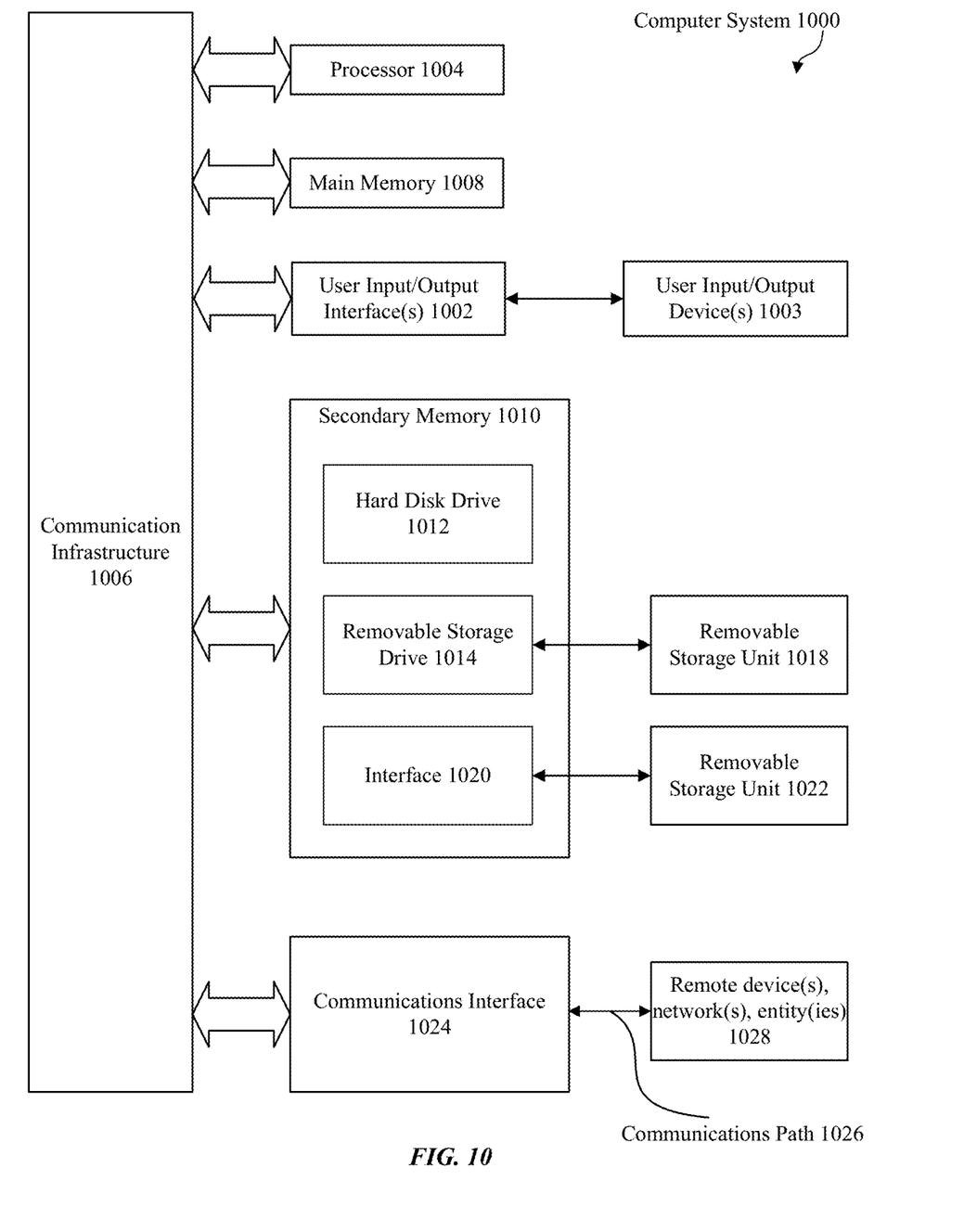
FIG. 10 is an example computer system for implementing some embodiments or portion(s) thereof.

Various embodiments can be implemented, for example, using one or more computer systems, such as computer system 1000 shown in FIG. 10. Computer system 1000 can be any well-known computer capable of performing the functions described herein. For example, and without limitation, stations 120 such as wireless communication devices, smart phones, tablets, personal assistants, laptops, or desktops as described with regard to FIG. 1 and/or other apparatuses and/or components shown in the figures. The stations 120, AP 110, and/or some or all of methods 300, 800, 900, of FIGS. 3, 8, and 9 respectively, may include the functions as shown in system 200 of FIG. 2 and/or system 1000 of FIG. 10.

Computer system 1000 includes one or more processors (also called central processing units, or CPUs), such as a processor 1004. Processor 1004 is connected to a communication infrastructure 1006 (e.g., a bus.) Computer system 1000 also includes user input/output device(s) 1003, such as monitors, keyboards, pointing devices, etc., that communicate with communication infrastructure 1006 through user input/output interface(s) 1002. Computer system 1000 also includes a main or primary memory 1008, such as random access memory (RAM). Main memory 1008 may include one or more levels of cache. Main memory 1008 has stored therein control logic (e.g., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to some embodiments, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1000, main memory 1008, secondary memory 1010 and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 10. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. An electronic device, comprising:
   a transceiver configured to transmit and receive wireless communications; and
   one or more processors communicatively coupled to the transceiver and configured to:
      receive, from an access point (AP), a contention window (CW) minimum value and a CW maximum value;

receive, from the AP, a first indication to utilize an adaptive CW (ACW) process to obtain a transmit opportunity (TXOP);

determine a CW error value based at least on the CW minimum value and the CW maximum value, wherein the CW error value enables ACW channel access by the electronic device;

determine that a CW is set to a first value between 0 and the CW minimum value;

transmit using the transceiver, first data at a time determined based at least in part on the CW;

determine that the first data transmission did not experience a collision;

set the CW to a second value, wherein the second value is less than the first value;

receive, from a first non-ACW station, a second indication that a non-ACW station is present;

transmit, to the AP, a third indication that the first non-ACW station is present; and utilize enhanced distributed channel access (EDCA) to obtain a second TXOP in response to the second indication that the non-ACW station is present.

2. The electronic device of claim 1, wherein the second value is equal to less than half the first value.

3. The electronic device of claim 1, wherein the second value is equal to (the first value −1)/2.

4. The electronic device of claim 1, wherein the one or more processors are further configured to:
transmit, using the transceiver, second data;
determine that the second data experienced a collision, wherein a current value of the CW is greater than or equal to the CW error value; and
set the CW to [2*(the current value of the CW)+1].

5. The electronic device of claim 1, wherein the one or more processors are further configured to:
transmit, using the transceiver, a second data transmission;
determine that the second data transmission experienced a collision, wherein a current value of the CW is less than the CW error value; and
set the CW value equal to the CW error value.

6. The electronic device of claim 1, wherein the one or more processors are further configured to:
determine a change in a throughput, a latency, or a number of non-ACW stations present, wherein the determination is based at least on a corresponding threshold being satisfied.

7. The electronic device of claim 1, wherein the one or more processors are further configured to:
receive a recommendation to associate with a different access point; and
associate with the different access point.

8. The electronic device of claim 1, wherein the one or more processors are further configured to:
in response to transmitting the third indication, transmit a schedule indicating when the electronic device will be active on a given channel; and
operate on a different channel for non-ACW communications.

9. The electronic device of claim 1, wherein the one or more processors are further configured to:
receive, from the AP, a fourth indication to utilize EDCA.

10. The electronic device of claim 1, wherein the one or more processors are configured to:
determine that the non-ACW station is no longer present; and
in response to the determination, utilize the ACW process to obtain the second TXOP.

11. The electronic device of claim 1, wherein the second value is greater than the CW minimum value.

12. The electronic device of claim 1, wherein the CW error value is based on an average of the exponents of the CW minimum value and the CW maximum value.

13. An electronic device comprising:
a transceiver configured to transmit and receive wireless communications; and
one or more processors communicatively coupled to the transceiver and configured to:
receive a contention window (CW) minimum value and a CW maximum value;
determine a CW error value based at least on the CW minimum value and the CW maximum value, wherein the CW error value enables adaptive CW (ACW) channel access by the electronic device;
determine a CW error exponent (CW_ERR_EXP) comprising: an average of an exponent of the CW minimum value (CW_MIN_EXP) and an exponent of the CW maximum value (CW_MAX_EXP), wherein CW_ERR_EXP=(CW_MIN_EXP+CW_MAX_EXP)/2, and wherein to determine the CW error value, the one or more processors are further configured to set the CW error value to 2EXP (CW_ERR_EXP) 1;
set a CW to a first value between 0 and the CW minimum value;
transmit, using the transceiver, first data at a time determined based at least in part on the first value;
determine that the first data did not experience a collision; and
set the CW to a second value, wherein the second value is lower than the first value.

14. An electronic device, comprising:
a transceiver configured to transmit and receive wireless communications; and
one or more processors communicatively coupled to the transceiver and configured to:
transmit a contention window (CW) minimum value, and a CW maximum value, wherein the CW minimum value and the CW maximum value are used to determine a CW error value for adaptive contention window (ACW) channel access by the electronic device;
transmit to a station, a first indication to utilize ACW to obtain a transmit opportunity (TXOP);
receive, in response to the first indication transmission, a second indication from the station that a non-ACW station is present; and
transmit, using the transceiver, a recommendation to the station based at least in part on the second indication, wherein the recommendation comprises a third indication to use enhanced distributed channel access (EDCA) to obtain the TXOP in response to the second indication that the non-ACW station is present.

15. The electronic device of claim 14, wherein the one or more processors are further configured to receive a schedule from the station indicating when the station will be available to utilize ACW.

16. The electronic device of claim 14, wherein the recommendation instructs the station to associate with a different access point (AP), and wherein the different AP supports an other channel access for obtaining a TXOP.

17. The electronic device of claim 14, wherein the one or more processors are further configured to change a channel of operation to a different frequency to support ACW wireless communications access among a collection of associated stations that does not include the station, and wherein the recommendation comprises a beacon comprising the different frequency.

18. A method, comprising:
receiving, from an access point (AP), a contention window (CW) minimum value and a CW maximum value;
receiving, from the AP, a first indication to utilize an adaptive contention window (ACW) process to obtain a transmit opportunity (TXOP);
determining at a first electronic device, a CW error value based at least on an average of exponents of the CW minimum value and the CW maximum value, wherein the CW error value enables adaptive contention window (ACW) channel access by the first electronic device;
setting at the first electronic device, a CW to a first value between 0 and the CW minimum value;
determining at the first electronic device, that a first data transmission experienced a collision;
setting at the first electronic device, the CW to the CW error value, wherein the CW error value is greater than the first value of the CW;
receiving, from a non-ACW station, a second indication that the non-ACW station is present;
transmitting, to the AP, a third indication that the non-ACW station is present; and
utilizing enhanced distributed channel access (EDCA) to obtain a second TXOP in response to the second indication that the non-ACW station is present.

19. The method of claim 18, further comprising:
determining a change in a throughput, a latency, or a number of non-ACW stations present, wherein the determination is based at least on a corresponding threshold being satisfied.

20. The method of claim 18, further comprising:
receiving a recommendation to associate with a different access point; and
associating with the different access point.

\* \* \* \* \*